United States Patent [19]

Swift et al.

[11] 4,076,917

[45] Feb. 28, 1978

[54] METHOD FOR CURING POLYMERS CONTAINING ONE OR MORE CARBOXY OR ANHYDRIDE FUNCTIONS AND COMPOSITIONS

[75] Inventors: Graham Swift, Blue Bell; Harry J. Cenci, Warminster, both of Pa.

[73] Assignee: Rohm and Haas Company, Philadelphia, Pa.

[21] Appl. No.: 686,004

[22] Filed: May 13, 1976

Related U.S. Application Data

[63] Continuation-in-part of Ser. No. 454,645, Mar. 25, 1974.

[51] Int. Cl.$^2$ .............................................. C08F 8/30
[52] U.S. Cl. .................................... 526/49; 260/75 N;
526/15; 526/16; 526/312
[58] Field of Search ..................... 526/15, 16, 49, 312;
260/75 N

[56] References Cited

U.S. PATENT DOCUMENTS

| | | | |
|---|---|---|---|
| 3,301,835 | 1/1967 | Watkins et al. | 260/82.1 |
| 3,528,939 | 9/1970 | Pratt et al. | 260/29.6 |
| 3,585,172 | 6/1971 | Nishiyama et al. | 260/78.5 |
| 3,759,915 | 9/1973 | Kottke | 260/41 R |
| 3,817,932 | 6/1974 | Albers et al. | 260/75 N |

*Primary Examiner*—John Kight, III

[57] ABSTRACT

β-hydroxyalkylamides and certain polymers thereof are disclosed as curing agents for polymers containing one or more carboxy or anhydride functions. Also, self-curing copolymers containing carboxy and β-hydroxyalkylamide functionality are disclosed. The β-hydroxyalkylamides are either known compounds or may be prepared by treating an ester with an appropriately substituted amine. The β-hydroxyalkylamides are effective in solution, aqueous emulsion and powder coating formulations.

24 Claims, No Drawings

METHOD FOR CURING POLYMERS CONTAINING ONE OR MORE CARBOXY OR ANHYDRIDE FUNCTIONS AND COMPOSITIONS

RELATIONSHIP TO OTHER APPLICATIONS

This is a continuation-in-part of Ser. No. 454,645, filed Mar. 25, 1974 and is related to other divisional applications thereof.

This invention relates to a novel method for curing or crosslinking polymers having carboxy or anhydride groups by treating the polymers with either a β-hydroxyalkylamide or a polymer prepared from a β-hydroxyalkylamide (I, infra). This invention also embraces self-curing polymers containing both carboxy and β-hydroxyalkylamide functionality.

Studies show that the β-hydroxyalkylamides employed in this invention are efficient curing agent for carboxy containing an anhydride containing polymers and can be employed without any catalyst required. In addition, the β-hydroxyalkylamides are soluble in a wide range of solvents including water. This water solubility is especially desirable because it eliminates the necessity of employing even relatively non-toxic organic solvents which often prove harmful when employed over a long period of time. Furthermore, structure variations of the β-hydroxyalkylamides are relatively simple to prepare so that one can obtain optimum crosslinking efficiency for a given polymer backbone.

The process for curing and crosslinking the carboxy and anhydride containing polymers comprises treating the polymer with either a β-hydroxyalkylamide of the formula:

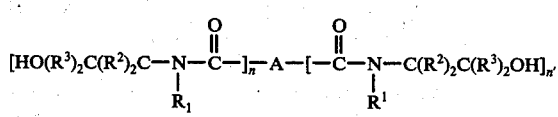

wherein A is a bond, hydrogen or a monovalent or polyvalent organic radical derived from a saturated or unsaturated alkyl radical wherein the alkyl radical contains from 1-60 carbon atoms, such as methyl, ethyl, propyl, butyl, pentyl, hexyl, heptyl, octyl, nonyl, decyl, eicosyl, triacontyl, tetracontyl, pentacontyl, hexylcontyl and the like; aryl, for example, mono- and dinuclear aryl such as phenyl, naphthyl and the like; tri-lower alkyleneamino such as trimethyleneamino, triethyleneamino and the like; or an unsaturated radical containing one or more ethylenic groups [>C=C<] such as ethenyl, 1-methylethenyl, 3-butenyl-1,3-diyl, 2-propenyl-1,2-diyl, carboxy lower alkenyl, such as 3-carboxy-2-propenyl and the like, lower alkoxy carbonyl lower alkenyl such as 3-methoxycarbonyl-2-propenyl and the like; $R^1$ is hydrogen, lower alkyl of from 1–5 carbon atoms such as methyl, ethyl, n-propyl, n-butyl, sec-butyl, tert-butyl, pentyl and the like or hydroxy lower alkyl of from 1–5 carbon atoms such as hydroxyethyl, 3-hydroxypropyl, 2-hydroxypropyl, 4-hydroxybutyl, 3-hydroxybutyl, 2-hydroxy-2-methylpropyl, 5-hydroxypentyl, 4-hydroxypentyl, 3-hydroxypentyl, 2-hydroxypentyl and the isomers of pentyl; $R^2$ and $R^3$ are the same or different radicals selected from hydrogen, straight or branched chain lower alkyl of from 1–5 carbon atoms or one of the $R^2$ and one of the $R^3$ radicals may be joined to form, together with the carbon atoms, such as cyclopentyl, cyclohexyl and the like; $n$ is an integer having a value of 1 or 2 and $n'$ is an integer having a value of 0 to 2 or when $n'$ is 0, a polymer or copolymer (i.e., $n$ has a value greater than 1 preferably 2–10) formed from the β-hydroxyalkylamide when A is an unsaturated radical.

Preferred compounds for curing the carboxy- or anhydride-containing polymers are those of the foregoing Formula I, wherein $R^1$ is H, lower alkyl, or $HO(R^3)_2C(R^2)_2C-$, $n$ and $n'$ are each 1, —A— is $-(CH_2)_m-$, $m$ is 0-8, preferably 2-8, each $R^2$ is H, and one of the $R^3$ radicals in each case is H and the other is H or a $C_1-C_5$ alkyl; that is,

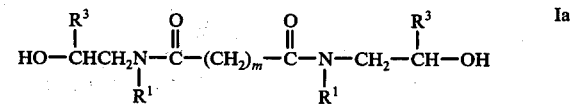

Ia wherein $R^1$, $R^3$, and $m$ have the meanings just given. Examples of the most preferred compounds fall within the formula:

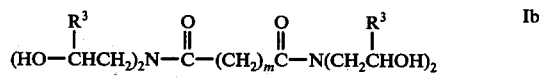

Ib wherein $R^3$ is limited to H in both cases or —CH$_3$ in both cases.

Specific examples falling within Formula Ib are bis[N,N-di(β-hydroxyethyl)] adipamide, bis[N,N-di(β-hydroxypropyl)] succinamide, bis[N,N-di(β-hydroxyethyl)] azelamide, bis[N-N-di(β-hydroxypropyl)] adipamide, and bis[N-methyl-N-(β-hydroxyethyl)] oxamide.

Thus, it may be seen that certain of the β-hydroxyalkyl amide compounds, particularly those of Formula Ia and Formula Ib, form a specific aspect of the invention.

These latter compounds are preferred because of their excellent water solubility, their fast reactivity with carboxy and anhydride groups and also because the crosslinked films prepared with these compounds have good weather resistance properties. In addition, the precursors are readily available.

Preferred among compounds of Formula Ib are those compounds wherein $R^1$ is methyl or hydroxyethyl and $m$ is an integer of 2 to 8.

The β-hydroxyalkylamides (I, supra) are either known compounds or may be prepared by treating an ester of Formula II (infra) with an amine of Formula III (infra) at a temperature in the range of from about ambient up to about 200° C. Optionally, a catalyst may be employed, for example, potassium methoxide or butoxide and the like; quaternary ammonium alkoxides, such as tetramethylammonium methoxide and the like; alkali metal and quaternary ammonium hydroxides at an amount in the range of from 0.1 to 1.0 wt. % based on the weight of the ester. The reaction is preferably conducted at elevated temperatures. The following equation illustrates this process:

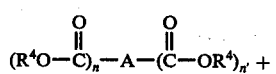

II

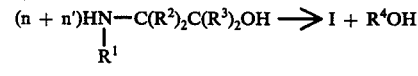

III wherein A, $R^1$, $R^2$, $R^3$, $n$ and $n'$ are as defined above and $R^4$ is lower alkyl of from 1–5 carbon atoms such as methyl, ethyl, propyl, n-butyl, tert-butyl, pentyl and the like.

The esters (II, supra) employed above are either known compounds or are prepared by esterifying the corresponding acid by standard esterifying procedures well-known to those skilled in the art. Among the preferred acids and mixtures thereof which can be employed are oxalic, malonic, succinic, glutaric, adipic, pimelic, suberic, azelaic, sebacic, 1,4-cyclohexane and the like and alkyl derivatives thereof. Also, there may be employed dimer and trimer acids and mixtures thereof prepared by the polymerization of $C_{18}$ fatty acids such as a dimer acid with 2 carboxy groups, 36 carbon atoms and an approximate molecular weight of 565 of a trimer acid with 3 carboxy groups, 54 carbon atoms and an approximate molecular weight of 850.

Some representative examples of the amines which can be employed include 2-aminoethanol; 2-methylaminoethanol; 2-ethylaminoethanol; 2-n-propylaminoethanol; 2,2'-iminodiethanol; 2-aminopropanol; 2,2'-iminodiisopropanol; 2-aminocyclohexanol; 2-aminocyclopentanol; 2-aminomethyl-2-methylethanol; 2-n-butylaminoethanol; 2-methylamino-1,2-dimethylethanol; 2-amino-2-methyl-1-propanol; 2-amino-2-methyl-1,3-propanediol; 2-amino-2-ethyl-1,3-propanediol and 2-amino-2-hydroxymethyl-1,3-propanediol.

To cause curing of the carboxy or anhydride containing polymer, the β-hydroxyalkylamide (I) or polymer thereof is mixed with said polymer at a ratio in the range of from about 0.5 to about 2 parts of hydroxy functions per one part of carboxy or anhydride function. At 1:1 ratio of carboxy to hydroxy and a 0.5:1 ratio of anhydride to hydroxy function being preferred. Ratios outside of the above ranges may be employed but crosslinking efficiency is greatly reduced. For use with solution polymers, the crosslinker is dissolved directly into the polymer solution with or without a solvent. Solvents which may be employed include aromatics, such as toluene, xylene and the like; aliphatics such as heptane, octane and the like; water, dimethylformamide, dimethylsulfoxide, also halogenated solvents, ethers, esters and alcohols, depending on the solubility of particular crosslinkers. The β-hydroxyamides (I) are especially useful because they can be employed without any solvent or in aqueous solution to afford non-polluting thermoset coatings. The aqueous solutions are prepared from the salts of the carboxy polymers, for example amine salts such as dimethylaminoethanol, trimethylamine, triethylamine, diethanolamine, methylethanolamine, those amines of Formula III or ammonium salts and the like. When films are cast or spray applied from aqueous solutions, the pollution of the atmosphere which occurs when organic solvents are employed is eliminated. This advantage of the β-hydroxyamides (I) is important even when preparing powder coatings since no special precautions need be taken with regard to the aqueous solvent. To prepare powder coatings, aqueous formulations such as described for emulsion or solution polymers or solutions in organic solvents suitable for freeze drying such as, dioxane and benzene, or spray drying e.g., toluene or methylene chloride are employed and the powder coating isolated by freeze drying or spray drying.

The polymer containing the β-hydroxyalkylamide (I) is cured by heating at a temperature in the range of from 125° to about 400° C. and preferably in the range of from 125° to 175° C. for a period of time in the range of from about 0.5 to about 30 minutes. It is not necessary to employ a catalyst to effect curing.

This invention embraces all carboxy and anhydride containing polymers. Examples of preferred monomers which can be incorporated into the polymer backbone and crosslinked with the β-hydroxyalkylamides (I, supra) include unsaturated monocarboxylic acids such as acrylic acid, methacrylic acid, crotonic acid and the like, unsaturated dicarboxylic acids, such as maleic acid, 2-methylmaleic acid, itaconic acid, 2-methylitaconic acid, α,β-methyleneglutaric acid and the like, unsaturated anhydrides, such as maleic anhydride, itaconic anhydride, acrylic anhydride, methacrylic anhydride and the like.

Polymers containing the β-hydroxyalkylamides can be used as coatings including general purpose industrial coatings, machinery and equipment coatings especially metal coatings, such as for cans, appliances, automobiles and the like. In addition, the β-hydroxyalkylamides can be used in forming films, fibers, paints, lacquers, varnishes, seamless flooring, caulks or impregnants as adhesives for both natural and synthetic materials, such as paper, textiles, wood, plastics, metal and leather; as binders for non-woven fabrics, in the preparation of inks and in all areas where epoxy and melamine finishes are presently employed.

It should be apparent from this disclosure that when copolymers containing β-hydroxyalkylamides (I, supra) are prepared with carboxy containing monomers, a self-curing polymer will be obtained and when prepared without any carboxy or anhydride containing monomers, curing of the copolymer may be effected by treating said copolymers with acids or anhydrides such as those saturated acids mentioned above in the preparation of the esters of Formula II and saturated anhydrides such as succinic, glutaric, phthalic, tetrahydronaphthalic, 1,2,4,5-benzenetetracarboxylic and the like.

The following are examples of the β-hydroxyalkylamides (I) and polymers which may be employed in this invention. However, the examples are illustrative only and it will be apparent to those skilled in the art that other β-hydroxyalkylamides and polymers thereof embraced by Formula I, supra, and also other carboxy and anhydride containing polymers may be employed in an analogous manner to afford crosslinked polymers.

EXAMPLE 1

Bis [N-methyl-N(β-hydroxyethyl)]sebacamide 2-methylaminoethanol (150 g.), sodium methoxide (1.0 g) and dimethyl sebacate 8230.0 g.) are heated under an atmosphere of nitrogen in a four neck 1 liter flask fitted with thermometer, stirrer and distallation head. Heating is controlled so that the head temperature remains in the range of 60° – 70° C. as methanol is removed. When methanol evolution ceases, the reaction flask is cooled and the creamy solid residue recrystallized from methanol/acetone//50/50 wt. %. The product, bis[N-methyl-N(β-hydroxyethyl)]sebacamide, m.p. 78° – 80° C. contains 0.25 wt. % free 2-methyaminoethanol as determined by potentiometric titration.

Elemental Analysis for $C_{16}H_{32}N_2O_4$: Calcd. C, 60.73; H, 10.17; N, 8.85; Found: C, 60.35; H, 10.17; N, 8.49.

EXAMPLE 2

Bis[N-methyl-N($\beta$-hydroxyethyl)]glutaramide 2-methylaminoethanol (75 g.), sodium methoxide (0.4 g.) and dimethyl glutarate (80.1 g.) are dissolved in methanol (128 g.) and allowed to react for 72 hours at 25° C. Methanol is removed at a temperature less than 30° C. under 20 mm Hg pressure. The resulting liquid product is pale yellow in appearance and contains 0.8% wt. of 2-methylaminoethanol as determined by potentiometric titration. This material, bis[N-methyl-N-($\beta$-hydroxyethyl)]glutaramide is acceptable for use in crosslinking reactions.

Elemental Analysis for $C_{12}H_{24}N_2O_4$: Calcd. C, 53.6; H, 9.0; N, 11.4; Found: C, 53.2; H, 9.5; N, 10.7.

By following substantially the procedure in Example 1 and by substituting the appropriate ester and amine for the dimethyl sebacate and 2-methylaminoethanol recited therein, other curing agents of this invention are prepared. The following equation taken together with Table I illustrates the starting materials and curing agents obtained:

TABLE 1

$$(CH_2)_n\overset{CO_2CH_3}{\underset{CO_2CH_3}{\diagdown}} + nHN\underset{R^1}{-}CH_2CH(R^3)OH \longrightarrow (CH_2)_n\underset{\underset{O}{\overset{\|}{CN}}\diagdown\underset{CH_2CH(R^3)OH}{R^1}}{\overset{\overset{O}{\overset{\|}{CN}}\diagup\underset{CH_2CH(R^3)OH}{R^1}}{}}$$

|  | II(a) |  | III(a) |  | I(b) | | |
|---|---|---|---|---|---|---|---|
| Ex. No. | n | R¹ | R³ | Melting Point ° C. | Elemental Analysis | | |
|  |  |  |  |  |  | C | H | N |
| 3 | 2 | —CH₃ | H | 101–104 | Calcd. | 51.7 | 8.7 | 12.1 |
|  |  |  |  |  | Found | 51.6 | 8.8 | 12.0 |
| 4 | 2 | H | —CH₃ | 117–120 | Calcd. | 51.7 | 8.7 | 12.1 |
|  |  |  |  |  | Found | 51.5 | 8.6 | 11.9 |
| 5 | 4 | H | H | 98–100 | Calcd. | 51.7 | 8.9 | 12.1 |
|  |  |  |  |  | Found | 51.5 | 8.6 | 12.0 |
| 6 | 4 | —(CH₂)₂OH | H | 128–130 | Calcd. | 52.5 | 8.8 | 8.7 |
|  |  |  |  |  | Found | 52.6 | 8.9 | 8.6 |
| 7 | 4 | H | —CH₃ | 99–102 | Calcd. | 55.4 | 9.3 | 10.8 |
|  |  |  |  |  | Found | 54.9 | 9.3 | 10.8 |
| 8 | 4 | —CH₃ | H | 77–99 | Calcd. | 55.4 | 9.3 | 10.8 |
|  |  |  |  |  | Found | 55.0 | 9.3 | 10.6 |
| 9 | 5 | —CH₃ | H | Liquid | Not Determined | | | |
| 10 | 7 | —CH₃ | H | Liquid | Not Determined | | | |
| 11 | 0 | —CH₃ | H | Liquid | Not Determined | | | |

EXAMPLE 12

N-Methyl-N-($\beta$-hydroxyethyl)methacrylamide

Methyl methacrylate (20 g., 0.2 m.), 2-methylaminoethanol (15 g., 0.2 m.), toluene (35.7 g.) and MEHQ (0.1 g.) are mixed under a nitrogen atmosphere in a flask equipped with a condenser, stirrer and thermometer. Sodium methoxide/methanol (4.0 g.) is added rapidly and the reaction temperature maintained at 20° C. by external cooling. The reaction is complete in 30 minutes as indicated by the residual base titration reaching a minimum. The crude product is treated with an excess of strong acid ion exchange resin (Amberlyst 15) to remove basic materials. The ion exchange resin is removed by filtration and the toluene removed under vacuum to afford 20 g. of N-methyl-N-($\beta$-hydroxyethyl)methacrylamide, b.p. 120°–122° C./0.5 mm.

Elemental Analysis for $C_7H_{13}NO_2$: Calcd. C, 58.8; H, 9.1; N, 9.7; O, 22.4; Found: C, 59.2; H, 9.1; N, 8.9; O, 22.8.

EXAMPLE 13

Bis[N,N-($\beta$-hydroxyethyl)]methacrylamide

To a flask equipped with a stirrer, nitrogen bleed, thermometer and condenser is added methyl methacrylate (100 g., 1 m.), diethanolamine (105 g., 1 m.), tert-butanol (175 g.) and MEHQ (0.2 g.). Sodium methoxide/methanol (18.5 g., 25 weight %) is then added rapidly and the temperature maintained below 25° C. by external cooling. After 90 minutes, 76% of the base charge is consumed. The product is isolated as described above in Example 12. Infrared analysis and nuclear magnetic resonance data are consistent with the assigned structure.

EXAMPLE 14

BA/MMA/St/MAN//60/12.5/20/7.5 wt. %

Butyl acrylate (BA) (288.0 g.), methyl methacrylate (MMA) (60.0 g.), styrene (ST) (96.0 g.), maleic anhydride (MAN)(36.0 g) and benzoyl peroxide (7.2 g.)are added to refluxing toluene (240.0 g.) over a period of 3 hours. After 0.5 hour hold at reflux, benzoyl peroxide (2.4 g.) in toluene (68.0 g.) is added over a period of one hour. A further hold of 0.5 hours at reflux is required for completion of the reaction. A toluene (372.0 g.) dilution yields a copolymer solution of 40.7% wt. solids and viscosity at 25° C. of 71 cps.

EXAMPLE 15 BA/MMA/St/MAN//60/15/20/5 wt. %

Butyl acrylate (288.0 g.), methyl methacrylate (72.0 g.), styrene (96.0 g.) and maleic anhydride (24.0 g.) are polymerized as described in Example 14 to yield a copolymer of 40.8% solids in toluene, viscosity 55 cps at 25° C.

EXAMPLE 16

BA/MMA/St/MAA//60/12.5/20.0/7.5

Butyl acrylate (288.0 g.), methyl methacrylate (60.0 g.), styrene (96.0 g.), methacrylic acid (36.0 g.) are polymerized in 75/25//toluene/2-ethoxyethyl acetate as described in Example 14 using benzoyl peroxide initiator. The final copolymer has a viscosity of 275 cps. at 25° C. and 40.4% solids.

EXAMPLE 17

MMA/BA/MAA//68.1/26.9/5.0 wt. %

A monomer mix of methyl methacrylate (742.6 g.), butyl acrylate (293.3 g.), methacrylic acid (54.5 g.) benzoyl peroxide (32.7 g.), n-dodecyl mercaptan (11.0 g.) and toluene (363.4 g.) is added to refluxing toluene (897.8 g.) under nitrogen over a period of 2.5 hours. After a thirty minute hold period at reflux, the polymerization is completed by the addition of benzoyl peroxide (8.7 g.) in toluene (363.4 g.) over 1 hour followed by a 30 minute hold at reflux. The resulting copolymer solution is clear and water white at 38.5% solids with a viscosity of 320 cps at 25° C. (Polymerization in the absence of chain regulator gives a polymer of 500 cps viscosity).

EXAMPLE 18

MMA/BA/MAA//75/20/5 wt. %

By following substantially the procedure of Example 17 and by employing methyl methacrylate (816.9 g.) butyl acrylate (218.1 g.), methacrylic acid (54.5 g.), n-dodecylmercaptan (11.0 g.) and toluene (363.4 g.), there is obtained a copolymer solution of 40.0% solids and 400 cps. at 25° C. In the absence of chain regulator, a polymer of viscosity 550 cps. is obtained.

EXAMPLE 19

MMA/BA/MAA//40/50/10 wt. %

Methyl methacrylate (400 g.), butyl acrylate (500 g.) and methacrylic acid (100 g.) are added simultaneously with dicumyl peroxide (3.0 g.) in 2-butoxyethanol (80 g.) over a 4 hour period to 2-butoxyethanol (172.5 g.) at 150° C. under an atmosphere of nitrogen with continuous stirring. The reaction temperature is maintained at 150° C. for 1 hour and then cooled to 100° C. Concentrated aqueous ammonia (66 g.) and deionized water (1126.5 g.) are added over a 20 minute period and the resulting clear solution cooled to 25° C. The pH of the solution is adjusted to 9 by the addition of concentrated aqueous ammonia (12 g.). The final product is a 39.3% wt. solution of the ammonium salt of copoly MMA/-BA/MAA//40/50/10 wt. % in water/2-butoxyethanol//83.7/16.3 wt. % and has a viscosity at 25° C. of 9600 cps.

EXAMPLE 20

EA/St/MAA//60/30/10 - 50 wt. % Solids in Solvesso 150/2-ethoxyethyl acetate//75/25 wt. % Solvent Ethyl acrylate (600 g.), styrene (300 g.), methacrylic acid (100 g.) and benzoyl peroxide (10 g.) are added to Solvesso 150/2-ethoxyethyl acetate 75/25 (900 g.) and maintained at 100° C. over a period of 3 hours. After a 0.5 hour hold at reflux, benzoyl peroxide (2.4 g.), in the same solvent (100 g.), is added over a period of one hour. A further hold of 0.5 hours at 110° C. is required for completion of the polymerization. The final copolymer solution had a viscosity of 700 cps. at 50 wt. % solids and 25%.

EXAMPLE 21

EA/MAA//95.9/4.1 wt. %

To a 3-liter 3-necked flask equipped with a a stirrer and nitrogen inlet tube, a thermometer and a reflux condenser is added the following: 8 parts of sodium dodecyl benzene sulfonate, 767.2 parts ethyl acrylate, 32.8 parts of methacrylic acid and 1560 parts of water. A slow stream of nitrogen is bubbled through the stirred emulsion. There is then added 8 parts of 34.9% hydrogen peroxide and 3.2 parts of sodium formaldehyde sulfoxylate dihydrate dissolved in 25 parts of water. The temperature of the reaction mixture rises from 23° C. to 76° C. As the reaction diminishes and the temperature decreases at 64° C., the reaction mixture is cooled with an ice bath. The pH at the end of the reaction is 2.9 and the solids content is 33.5 wt. %.

EXAMPLE 22

EA/MMA/MAA//66/29/5 wt. %

By following substantially the procedure described in Example 21 and by substituting for the comonomer mix exployed therein: ethyl acrylate (528 parts), methyl methacrylate (232 parts) and methacrylic acid (40 parts), there is obtained an emulsion polymer having a solids content of 33.7 wt. % and a pH of 3. Monomer conversion is essentially 100%.

EXAMPLE 23

N,N-di($\beta$-Hydroxyethyl)formamide 2,2'-iminodiethanolamine (2.0 g., 2 ml.) is added over a period of one hour to a stirred reactor containing ethyl formate (2.8 g., 2 ml.) at 25° C. in an atmosphere of nitrogen. The temperature was allowed to rise to 57° C., and slowly subside as the exotherm declined. The crude product is held at 53° C. and sufficient vacuum applied to cause distillation of the ethanol by-product. The final product has a basicity of 0.1 meq./g. indicating a product of ~ 98% purity. This is used directly in the following crosslinking example.

EXAMPLE 24

N,N-di($\beta$-Hydroxyethyl)formamide

An oligomeric BMA/MAA//48/52 wt. % (acidity 6.05 meq./g.) at 40% weight solid in aqueous ammonia, pH 9 is treated with an equivalent quantity of N,N-di($\beta$-hydroxyethyl)formamide. Films of 10 ml. wet thickness are cast on glass slides and air-dried for 30 minutes and then baked for 30 minutes at 350° F. The cured film is clear, has a linear swell ratio of 1.6 in DMF and is resistant to water at 60° C. (i.e., non-whitening).

EXAMPLE 25

Tris-[N-methyl-N-($\beta$-hydroxyethyl)]trimellitatriamide 2-methylaminoethanol (225 g.), sodium methoxide (1 g.) and trimethyl trimellitate (252 g.) are heated under an atmosphere of nitrogen in a four-necked, 1-liter flask fitted with thermometer, stirrer and distillation head. Heating is controlled so that the head temperature remains in the range 60° - 70° C. as methanol is removed. When the methanol ceases to distill (pot temperature 170° C), the product is cooled, titrated for residual base and dissolved in methanol. The crude product is treated with excess strong acid ion-exchange resin (Amberlyst 15) and the basic material removed. Filtration, to remove ion-exchange beads, and vacuum stripping yields a thick pale brown syrupy product containing less than 1 wt. % residual 2-methylaminoethanol as determined by potentiometric titration.

EXAMPLE 26

Curing of EA/St/MAA//60/30/10

A polymer of the composition EA/ST-/MAA//60/30/10 at 50% solids is mixed with bis[N-methyl-N-($\beta$-hydroxyethyl)]-adipamide in a 1/1//acid/hydroxyl functionality ratio in Solvesso 150/2-ethoxyethyl acetate//75/25 wt. % solvent. Films of 10 mil wet thickness are cast on glass slides and after 30 minutes of air drying, the films are baked at 150° C. for 1 hour. Gravimetric swell ratios on the cured films in methanol and toluene are determined to be 1.6 and 2.9, respectively. The control (polymer without crosslinker) which is baked under identical conditions is soluble in both solvents.

EXAMPLE 27

Curing of EA/MAA//95.9/4.1

A polymer of the composition EA/MAA//95.9/4.1 wt. % is crosslinked at 150° C. for 30 minutes by bis[N-methyl-N-($\beta$-hydroxyethyl)]oxamide, bis[N,N-di($\beta$-hydroxyethyl)]adipamide, bis[N,N-di($\beta$-hydroxypropyl)]succinamide and bis[N,N-di($\beta$-hydroxypropyl)]adipamide, respectively, as indicated by the resulting film gravimetric swell ratios of 6.3, 2.8, 9.3 and 9.6, respectively, in toluene solution. In the absence of crosslinker, the film obtained is completely soluble in toluene.

EXAMPLE 28

Curing of EA/MMA/MAA//66/29/5

An emulsion polymer of the composition EA/MMA/MAA//66/29/5 wt. % is treated with a stoichiometric amount of bis[N-methyl-N-($\beta$-hydroxyethyl)]adipamide. After film casting and air-drying for 24 hours, the resulting film is cured at 150° C. for 1.0 and 0.5 hours. Swell ratios on the resulting polymer are determined to be 4.7 and 6.7, respectively, indicating better cure with longer heating.

EXAMPLE 29

Powder

The polymers prepared in Examples 17 and 18 are solvent exchanged into benzene. Formulations with bis[(N-methyl-N-$\beta$-hydroxyethyl)]azelamide on freeze drying result in the isolation of fine white powders. These are ground to an appropriate sieve size, usually 200 mesh and electrostatically applied to a metal substrate. The films obtained on flow-out at 150° C. to 200° C. show varying degrees of crosslinking as evaluated by solvent resistance and mechanical properties. Typically, an air pressure of 2 psi is used to transport the polymer powder to the substrate and the "gun" charges the particles to 50 kv. maximum.

EXAMPLE 30

Preparation of Self-curing Polymers Containing N-methyl-N-($\beta$-hydroxyethyl)methacrylamide (MHEMAM)

A. Preparation of MMA/BA/MAA/MHEMAM//66.7/20/5.0/8.3 wt. %

| Charge | Grams | |
|---|---|---|
| MMA | 667 | |
| BA | 200 | Initiator and |
| MAA | 50 | Monomer Mix |
| MHEMAM | 83 | |
| Toluene | 168.8 | |
| n-propyl acetate | 168.8 | |
| 2,2'-azobisisobutyronitrile (AIBN) | 7.5 | Initiator and Monomer Mix |
| Toluene | 375 | |
| n-propyl acetae | 375 | Heel Charge |
| Toluene | 168.8 | 1st Chaser |
| n-propyl acetate | 68.8 | |
| AIBN | 0.75 | |
| Toluene | 37.5 | 2nd Chaser |
| n-propyl acetae | 37.5 | |
| AIBN | 0.75 | |

*Procedure:* The Heel Charge is added to a kettle fitted with stirrer, condenser, nitrogen inlet and addition funnel. The mixture is heated to reflux (100° C.) At reflux, the initiator and monomer mix is added over 2.5 hours, while maintaining reflux and a nitrogen blanket. The 1st Chaser catalyst is then added over one hour and held for ¼ hour. The 2nd Chaser catalyst is then added over ½ hour and held for 1 hour. The mixture is then cooled and the reaction terminated. *Product Analysis:* solids, 39.3 wt. %; conversion, 98.3%, viscosity at 25° C. is 350 cps. *Cure:* A 2 mil film of the above polymer baked at 400° F. for 30 minutes is insoluble in n-propyl acetate. A control polymer of the composition MMA/BA/MHEMAM//73.4/19.6/7.0 prepared in an identical manner and baked as described above is soluble in n-propyl acetate.

By following substantially the procedure described in Example 30(A) above and by substituting different ratios of the monomer compositions, there are obtained other curable polymers. The following table lists the compositions and results:

TABLE II

| Ex. No. | MMA | BA | MAA | MHEMAM | Solids (Wt. %) | Visc. (cps.) | Conv. % |
|---|---|---|---|---|---|---|---|
| 30B | 59.2 | 27.5 | 5.0 | 8.3 | 39.4 | 210 | 98.5 |
| 30C | 66.7 | 20.0 | 5.0 | 8.3 | 39.4 | 365 | 98.5 |
| 30D | 60.0 | 20.0 | 7.5 | 12.5 | 38.2 | 450 | 95.5 |

EXAMPLE 31

Curing of BA/MAA/St/MAN//60/12.5/20/7.5

A solution polymer of the composition BA/MAA/St/MAN//60/12.5/20/7.5 wt. % is blended with bis[N,N-di($\beta$-hydroxyethyl)]adipamide and films of 10 mil. thickness cast. After air drying for 30 minutes, the polymer is cured at 125° C., 150° C. and 175° C. for 30 minutes. Unidimensional swell ratios in xylene are 1.6, 1.0 and 1.0, respectively. The control is soluble in xylene.

EXAMPLE 32 Crosslinking of 50MMA/40BA/10MAA wt. % with Hydroxyamides

Crosslinking reaction results of 50MMA/40BA/10-MAA with hydroxyamides using a stoichiometry of 1/1/carboxy/hydroxy functionality are shown in the following Table III. In all cases, the hydroxyamide dissolved in water is blended with the polymer dissolved in aqueous butyl Cellosolve as the ammonium salt and films cast on Alodine Q Aluminum panels. After air drying for 30 minutes, the films are baked at 350° F. (150° C.) for 30 minutes and then evaluated as shown in the table of results. Comparison with a control film baked in the absence of crosslinker indicates the effect of crosslinking on film properties.

TABLE III

| Ex. No. | Hydroxyamide | Film Thickness mils | Tukon KHN | Direct Impact in. lb. | Print 2 hrs./140° F. | $H_2O$ 140° F. 24 hrs. | MEK[1] Resistance |
|---|---|---|---|---|---|---|---|
| A | Bis[N-methyl-N($\beta$-hydroxyethyl)]-azelamide | 2.0 | 0.38 | 35 | None | OK | 5% |
| B | Bis[N,N-di($\beta$-hydroxyethyl)]-azelamide | 2.0 | 2.0 | 35 | None | Blistered | >100 cycles |
| C | Bis[N-methyl-N($\beta$-hydroxyethyl)]-adipamide | 1.8 | 0.7 | 40 | None | Blistered | >100 cycles |
| D | bis[N,N-di($\beta$-hydroxyethyl)]-adipamide | 1.6 | 2.0 | 18 | Trace | Blistered | 5% |
| E | Bis[N-methyl-N($\beta$-hydroxyethyl)]-succinamide | 1.6 | 0.92 | 25 | None | Blistered | 10% |
| F | Control - No crosslinker | 2.0 | 2.0 | 60 | Moderate | Heavy Blisters | 0 cycles |

[1]Film rubbed with MEK soaked swab. Either passes 100 cycles, fails (0 cycles) or loses a percent of film (i.e., 5% or 10% in table).

We claim:

1. A method of curing polymers which comprises (1) mixing a polymer containing carboxy groups or carboxylic anhydride groups or salts of said carboxy groups with a $\beta$-hydroxyalkyl amide of the formula:

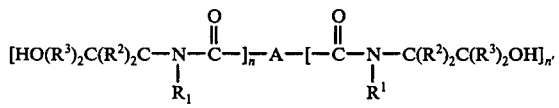

wherein A is a bond, hydrogen, a monovalent or polyvalent organic radical derived from a saturated or unsaturated alkyl containing from 1 to 60 carbon atoms, aryl, tri-lower alkyleneamino or an ethylenically unsaturated radical; $R^1$ is hydrogen, lower alkyl having 1 to 5 carbon atoms, or hydroxyalkyl having from 1 to 5 carbon atoms; $R^2$ and $R^3$ are the same or different radicals selected from hydrogen, straight or branched chain lower alkyl having from 1 to 5 carbon atoms, or one of the $R^2$ and one of the $R^3$ radicals joined together with the carbon atoms to which they are attached to form cycloalkyl; $n$ is an integer of 1 or 2 and $n'$ is an integer of 0 to 2; $n$ being 2 when $n'$ is 0; and (2) heating the mixture at a temperature of from about 125° to about 400° C. until a cured polymer is obtained.

2. A method of curing polymers which comprises
(1) mixing a polymer, containing carboxy groups or carboxylic anhydride groups or salts of said carboxylic groups, with a $\beta$-hydroxyalkylamide of the formula:

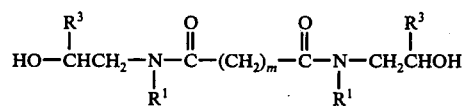

wherein $m$ is 0–8; $R^1$ is hydrogen, lower alkyl having 1 to 5 carbon atoms, or hydroxylakyl having from 1 to 5 carbon atoms; and $R^3$ is selected from hydrogen and straight or branched chain lower alkyl having from 1 to 5 carbon atoms, and (2) heating the mixture at a temperature of from about 125° to about 400° C., until a cured polymer is obtained.

3. The method of claim 2 in which $R^1$ is hydroxyalkyl and the $\beta$-hydroxyalkyl amide has the formula:

$$(HO-\overset{R^3}{\underset{|}{C}}-CH_2)_2N-\overset{O}{\overset{\|}{C}}-(CH_2)_m-\overset{O}{\overset{\|}{C}}-N(CH_2-\overset{R^3}{\underset{|}{CH}}-OH)_2$$

wherein $R^3$ is —H or —$CH_3$.

4. The method of claim 3 in which the carboxy, carboxylic acid salt groups, or anhydride groups are in an addition copolymer of ethylenically unsaturated monomers, and the copolymer is prepared with at least one monomer selected from acrylic acid, methacrylic acid, crotonic acid, maleic acid, 2-methylmaleic acid, itaconic acid, 2-methylitaconic acid, $\beta$-methyleneglutaric acid, maleic anhydride, itaconic anhydride, acrylic anhydride, or methacrylic anhydride.

5. The method of claim 1 in which the carboxy, carboxylic acid salt groups, or carboxylic anhydride groups are present in an addition polymer of ethylenically unsaturated monomers.

6. The method of claim 4 which comprises mixing said carboxy or anhydride containing polymer with the $\beta$-hydroxyalkyl amide at a ratio in the range of from about 0.5 to about 2 parts of hydroxy function per 1 part of carboxy function wherein the anhydride group is equal to two carboxyl functions, and then heating the mixture at a temperature in the range of from about 125° to about 175° C.

7. The method of claim 5 which comprises mixing said carboxy, carboxylic acid salt or anhydride containing polymer with the $\beta$-hydroxyalkyl amide at a ratio of hydroxy to carboxy functions of between 0.5:1 and 1:1, the anhydride being equal to two carboxy functions and then heating the mixture at a temperature in the range of from about 125° to about 175° C.

8. The method of claim 6 wherein a liquid solvent selected from an aromatic, aliphatic, water, dimethylformamide, dimethylsulfoxide, ether, ester or alcohol is employed.

9. The method of claim 7 wherein a liquid solvent selected from an aromatic, aliphatic, water, dimethylformamide, dimethylsulfoxide, ether, ester or alcohol is employed.

10. The method of claim 8 wherein $m$ is 4.

11. A curable composition containing a mixture of an addition copolymer of ethylenically unsaturated monomers containing carboxy groups, carboxylic acid salt groups, or carboxylic anhydride groups with a β-hydroxyalkylamide of the formula:

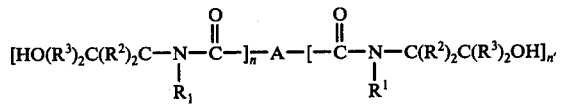
I wherein A is a bond, hydrogen, a monovalent or polyvalent organic radical derived from a saturated or unsaturated alkyl containing from 1 to 60 carbon atoms, aryl, tri-lower alkyleneamino or an unsaturated radical; $R^1$ is hydrogen, lower alkyl having 1 to 5 carbon atoms, or hydroxyalkyl having from 1 to 5 carbon atoms; $R^2$ and $R^3$ are the same or different radicals selected from hydrogen, straight or branched chain lower alkyl having from 1 to 5 carbon atoms, or one of the $R^2$ and one of the $R^3$ radicals joined together with the carbon atoms to which they are attached to form cycloalkyl; $n$ is an integer of 1 or 2 and $n'$ is an integer of 0 to 2; $n$ being 2 when $n'$ is 0.

12. A curable composition containing a mixture of (a) an addition copolymer of ethylenically unsaturated monomers containing carboxy groups, carboxylic acid salt groups, or carboxylic anhydride groups with (b) a β-hydroxyalkylamide of the formula:

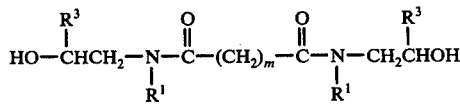
Ia wherein $m$ is 0–8; $R^1$ is hydrogen, lower alkyl having 1 to 5 carbon atoms, or hydroxyalkyl having from 1 to 5 carbon atoms; and $R^3$ is selected from hydrogen and straight or branched chain lower alkyl having from 1 to 5 carbon atoms.

13. The composition of claim 12 in which $R^1$ is hydroxyalkyl and the β-hydroxyalkyl amide has the formula:

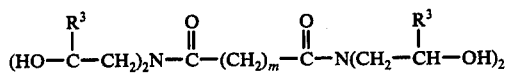

wherein $R^3$ is —H or —$CH_3$.

14. The composition of claim 13 in which the carboxy, carboxylic acid salt groups, or carboxylic anhydride groups are in an addition copolymer of ethylenically unsaturated monomers, and the copolymer is prepared with at least one monomer selected from acrylic acid, methacrylic acid, crotonic acid, maleic acid, 2-methylmaleic acid, itaconic acid, 2-methylitaconic acid, β-methyleneglutaric acid, maleic anhydride, itaconic anhydride, acrylic anhydride, and methacrylic anhydride.

15. The composition of claim 11 in which the carboxy, carboxylic acid salt groups, or carboxylic anhydride groups are present in an addition polymer of ethylenically unsaturated monomers.

16. The composition of claim 14 in which the β-hydroxyalkyl amide and carboxylic acid functions are present in a ratio of hydroxy to carboxy of between 0.5:1 and 2:1, the anhydride group being equal to two carboxy functions.

17. The composition of claim 15 in which the β-hydroxyalkyl amide and carboxylic acid functions are present in a ratio of hydroxy to carboxy of between 0.5:1 and 2:1, the anhydride group being equal to two carboxy functions.

18. The composition of claim 16 containing a liquid solvent selected from an aromatic, aliphatic, water, dimethylformamide, dimethylsulfoxide, ether, ester or alcohol.

19. The composition of claim 17 containing a liquid solvent selected from an aromatic, aliphatic, water, dimethylformamide, dimethylsulfoxide, ether, ester or alcohol.

20. The composition of claim 18 wherein $m$ is 4.

21. A cured polymeric material prepared by the process of claim 1.

22. A cured polymeric material prepared by the method of claim 2.

23. An article of manufacture in the form of a substrate having a coating of the cured polymeric material of claim 22.

24. The cured polymeric material of claim 22 in the form of a film.

* * * * *